United States Patent
Inuzuka et al.

[11] Patent Number: 6,166,859
[45] Date of Patent: Dec. 26, 2000

[54] VIEWFINDER OPTICAL SYSTEM AND OPTICAL APPARATUS HAVING THE SAME

[75] Inventors: Yumiko Inuzuka, Yokohama; Hiroshi Saito, Kawasaki, both of Japan

[73] Assignee: Canon Kabushiki Kaisha, Tokyo, Japan

[21] Appl. No.: 09/365,868

[22] Filed: Aug. 3, 1999

[30] Foreign Application Priority Data

Aug. 5, 1998 [JP] Japan .................................. 10-233583

[51] Int. Cl.⁷ .......................... G02B 27/14; G02B 27/10; G02B 25/00; G03B 13/08
[52] U.S. Cl. .......................... 359/633; 359/627; 359/631; 359/643; 396/386
[58] Field of Search ..................... 359/627, 630, 359/631, 633, 727, 730, 731, 637, 638; 396/373, 384, 385, 386

[56] References Cited

U.S. PATENT DOCUMENTS

| | | | |
|---|---|---|---|
| 3,674,334 | 7/1972 | Offner | 359/366 |
| 4,775,217 | 10/1988 | Ellis | 313/524 |
| 5,063,586 | 11/1991 | Jewell et al. | 378/34 |
| 5,093,567 | 3/1992 | Staveley | 250/221 |
| 5,689,736 | 11/1997 | Okuyama et al. | 396/51 |
| 5,706,136 | 1/1998 | Okuyama et al. | 359/630 |
| 5,754,900 | 5/1998 | Suda | 396/296 |
| 5,815,741 | 9/1998 | Okuyama et al. | 396/51 |
| 5,936,773 | 8/1999 | Togino | 359/630 |
| 5,999,311 | 12/1999 | Nanba et al. | 359/365 |
| 9,008,948 | 12/1999 | Togino | 359/637 |

FOREIGN PATENT DOCUMENTS

| | | |
|---|---|---|
| 58-62337 | 4/1983 | Japan . |
| 1-160427 | 6/1989 | Japan . |
| 7-104209 | 4/1995 | Japan . |
| 7-333551 | 12/1995 | Japan . |
| 8-50256 | 2/1996 | Japan . |
| 8-179223 | 7/1996 | Japan . |
| 8-179238 | 7/1996 | Japan . |
| 8-234136 | 9/1996 | Japan . |
| 8-234137 | 9/1996 | Japan . |

*Primary Examiner*—Georgia Epps
*Assistant Examiner*—Saeed Seyrafi
*Attorney, Agent, or Firm*—Fitzpatrick, Cella, Harper & Scinto

[57] ABSTRACT

A viewfinder optical system for conducting light from an object to an observer includes a plurality of reflecting surfaces having optical powers. Optical paths of each ray of a light flux reflected successively by the plurality of reflecting surfaces intersect each other at least twice, and the light from the object forms an image at least twice when passing through the viewfinder optical system.

8 Claims, 4 Drawing Sheets

VIEWFINDER OPTICAL SYSTEM AND OPTICAL APPARATUS HAVING THE SAME

BACKGROUND OF THE INVENTION

1. Field of the Invention

The present invention relates to viewfinder optical systems suited to be used in lens shutter cameras or video cameras and, more particularly, to a viewfinder optical system which utilizes a surface of rotational asymmetry to minimize the size of the entire optical system, while still permitting a non-inverted erecting viewfinder image of good quality to be observed.

2. Description of Related Art

Heretofore, for viewfinder systems adapted for an photographic cameras or video cameras, there have been proposed various viewfinder optical systems of the real image type in which a viewfinder image that is a real image formed by an objective lens on a primary image forming plane is observed through an eyepiece lens. Such a viewfinder optical system of the real image type is easier than a viewfinder optical system of the virtual image type in obtaining a compact form of the entire optical system, and is, therefore, in recent years, used in a great number of zoom-lens-equipped cameras.

As a viewfinder optical system of the real image type, mention may be made of, for example, Japanese Laid-Open Utility Model Application No. Sho 58-62337, in which an object image (viewfinder image) formed on the primary image forming plane by the objective lens is converted into a non-inverted erecting viewfinder image by an image inverting means such as a porro-prism, and the non-inverted erecting viewfinder image is observed through the eyepiece lens. Further, in Japanese Laid-Open Utility Model Application No. Hei 1-160427, there has been proposed a viewfinder optical system of the real image type in which a roof-type reflecting member, two mirrors, etc., is disposed in the optical path for the purpose of converting a viewfinder image into a non-inverted erecting image.

In the viewfinder optical system of the real image type using an image inverting means such as a porro-prism for obtaining a non-inverted erecting image, the objective lens for forming an object image on the primary image forming plane and the image inverting means are clearly distinguished from each other in the optical function. In other words, the conventional image inverting means makes no contribution to an optical power in forming the object image on the primary image forming plane.

For this reason, in the case of a viewfinder optical system in which a part of the image inverting means (for example, a prism member) is disposed in the space between the objective lens and the primary image forming plane, the back focal distance of the objective lens must be made long. For this purpose, it is necessary to employ the retro focus type in making up the objective lens, and the degree of retro focus has to be strengthened depending on the back focal distance. Therefore, the objective lens tends to increase in size.

Further, in the case of a viewfinder optical system in which a part of the image inverting means is disposed in the space between the objective lens and the primary image forming plane and a total-reflection surface for bending the optical path is disposed on the object side of the primary image forming plane, it is necessary to form the objective lens into an exit-side telecentric system so as to enable the total-reflection surface to effectively totally reflect the entirety of a light flux. As a result, the objective lens tends to increase in size.

Further, in the case of a viewfinder optical system of the secondary image forming type in which a viewfinder image formed on the primary image forming plane by the objective lens is relayed to a secondary image forming plane by a relay lens system (relay system) and the viewfinder image formed on the secondary image forming plane is observed through the eyepiece lens, an increased number of lenses are required for re-forming the viewfinder image. Therefore, the total length of the entire optical system becomes longer. Moreover, to correct chromatic aberrations, even larger a number of lenses becomes required.

BRIEF SUMMARY OF THE INVENTION

It is an object of the invention is to provide a viewfinder optical system of the real image type which is capable of correcting well various aberrations and permitting a good viewfinder image to be observed, while reducing the bulk and size of the viewfinder optical system to a minimum.

To attain the above object, in accordance with an aspect of the invention, there is provided a viewfinder optical system, which comprises a plurality of reflecting surfaces having with optical powers, optical paths of each ray of a light flux reflected successively by the plurality of reflecting surfaces intersecting each other at least twice. Light from an object forms an image at least twice when passing through the viewfinder optical system.

Further, in accordance with another aspect of the invention, there is provided an optical apparatus including the viewfinder optical system of the invention.

The above and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
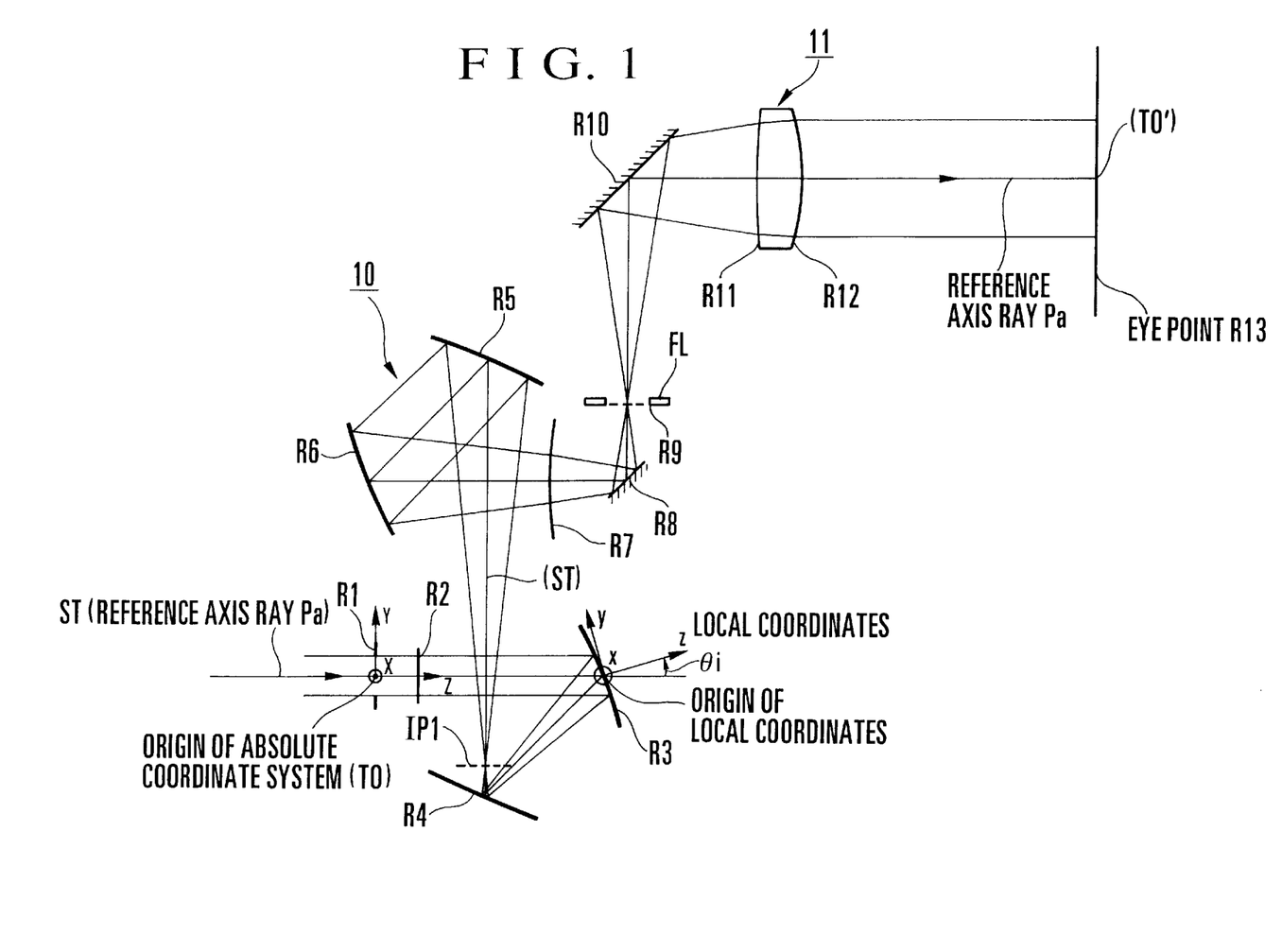
FIG. 1 is a diagram of geometry for explaining the coordinate system in the embodiments of the invention.

First, the way of expression of the dimensions of the constituent parts of the embodiments of the invention and the common rules of the embodiments are explained by using FIG. 1.

Figure 2:
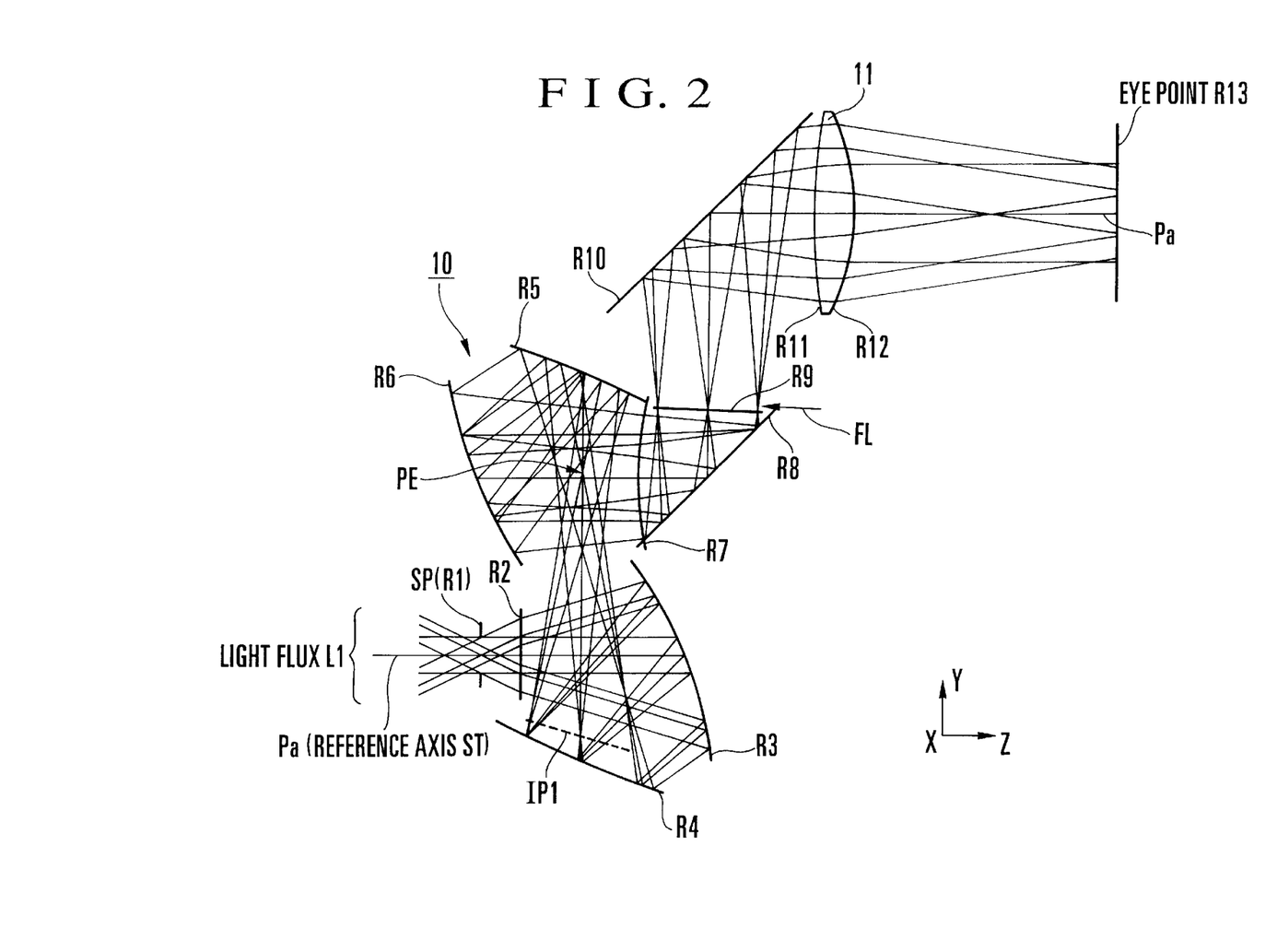
FIG. 2 is a sectional view of the main parts of a first embodiment of the invention.

FIG. 1 is a diagram of geometry for explaining the coordinate system in which to define the design parameters of the viewfinder optical system of the invention. Further, FIG. 2 is a sectional view of the main parts of a viewfinder optical system according to a first embodiment of the invention, which will be described later, and is illustrated in correspondence with the various elements shown in FIG. 1. In the embodiments of the invention, the surfaces are numbered consecutively along a ray of light Pa advancing from an object side to an image plane side (the ray of light Pa being hereinafter referred to as the "reference axis ray"), so that the i-th surface is labeled as "Ri".

Since the viewfinder optical system of the invention is an eccentric optical system, the surfaces constituting the optical system have no common optical axis. Therefore, in the embodiments of the invention, there is first set an absolute coordinate system with an original point TO thereof set at the center of the ray-effective diameter of the first surface R1.

Then, the route of a ray (reference axis ray Pa) advancing from the original point TO to the center (TO') of the last surface is defined as a reference axis ST of the optical system. Incidentally, in the embodiments, the eye point is assumed to be the last surface for the sake of convenience. Further, in the embodiments, the reference axis ST has a direction (orientation). The direction of the reference axis ST is taken as positive when being the same as the advancing direction of the reference axis ray Pa.

Although in the embodiments of the invention the reference axis ST which serves as the reference of the optical system is determined as described above, determination of an axis which serves as the reference of the optical system may be made otherwise if it is more suitable on the optical design, on the setting of aberrations, or on the expression of shapes of all the surfaces constituting the optical system. For example, the route of a ray passing through the center of an image plane and one of the center of a stop, an entrance pupil, an exit pupil or the first surface of the optical system and the center of the last surface may be set as the reference axis which serves as the reference of the optical system.

In the embodiments of the invention, as the reference axis ST, there is set a route in which a ray (reference axis ray) advancing from the center TO of the ray-effective diameter of the first surface R1 to the center TO' of the last surface is refracted and reflected by the refracting surfaces and reflecting surfaces. The refracting surfaces and reflecting surfaces are numbered in the same order as that in which the reference axis ray is subjected to refraction and reflection in succession.

Accordingly, the reference axis changes its direction each time when one surface is followed by another in succession and according to the law of refraction or reflection, finally reaching the eye point.

In each of the embodiments of the invention, the optical system is constructed with inclusion of rotationally-asymmetric surfaces which are tilting fundamentally all in one and the same plane. Therefore, the absolute coordinate system (X, Y, Z) is determined as follows:

Z axis: a section of the reference axis which passes through the original point TO and advances to the second surface R2;

Y axis: a straight line which passes through the original point TO and makes an angle of 90° counterclockwise in the tilt plane (in the paper of FIG. 1) with respect to the Z axis; and X axis: a straight line which passes through the original point TO and is perpendicular to each of the Z axis and the Y axis (straight line normal to the paper of FIG. 1).

Further, in expressing the shape of the i-th surface constituting the optical system, it becomes easily understandable for recognition of the shape if the shape of the i-th surface is expressed by using a local coordinate system with an original point thereof set at the intersection of the reference axis ST with the i-th surface rather than by using the absolute coordinate system (X, Y, Z). Therefore, in the embodiments showing the numerical data of the design parameters, the shape of the i-th surface is expressed by using the local coordinate system.

In this connection, the tilt angle $\theta i$ of the i-th surface in the YZ plane is measured in units of degree with respect to the reference axis ray by taking the counterclockwise direction in the paper of FIG. 1 as positive. Specifically speaking, x, y and z axes of the local coordinate system are set as follows:

z axis: a straight line which passes through the original point of the local coordinate system and makes an angle $\theta i$ counterclockwise in the YZ plane with respect to the incident reference axis ray;

y axis: a straight line which passes through the original point of the local coordinate system and makes an angle of 90° counterclockwise in the YZ plane (in the paper of FIG. 1) with respect to the z direction; and x axis: a straight line which passes through the original point of the local coordinate system and is perpendicular to the YZ plane.

Further, Di denotes the scaler quantity representing the separation between the original points of the local coordinate systems for the i-th and (i+1) st surfaces, and Ni and vi denote respectively the refractive index and Abbe number of the medium between the i-th and (i+1) st surfaces. Incidentally, the stop and the last plane, too, are displayed each as one flat plane.

In the embodiments of the invention, the optical systems has an aspheric surface of rotational symmetry based on the spherical surface, and an aspheric surface of rotational asymmetry. For the base of the aspheric surface of rotational symmetry, the spherical portion to be used is taken as the spherical shape with its radius of curvature Ri described. The radius of curvature Ri is given either sign. As viewed along the reference axis (the reference axis ray Pa in FIG. 1) advancing from the first surface to the last surface, if the center of curvature lies toward the first surface, the given sign is minus, or if toward the last surface, plus.

The spherical surface is formed to the shape expressed by the following equation:

$$z = \frac{y^2/R}{1 + \sqrt{1 - (y/R)^2}}$$

The shape of the aspheric surface of rotational asymmetry (free form surface) is expressed by the following equation:

$$z = A/B + $$
$$C20x^2 + C11xy + C02y^2 + $$
$$C30x^3 + C21x^2y + C12xy^2 + C03y^3 + $$
$$C40x^4 + C31x^3y + C22x^2y^2 + C13xy^3 + C0y^4 + \ldots$$

where
$A = (a+b)(y^2 \cdot \cos2t + x^2)$ $$B = 2\cos t \left[ 1 + \frac{1}{2}(a-b) \cdot y \cdot \sin t + \sqrt{1 + (a-b) \cdot y \cdot \sin t - \left\{ ab + \frac{1}{4}(a+b)^2 \tan^2 t \right\} \cdot x^2} \right]$$

The shape of the aspheric surface of rotational symmetry is expressed by the following equation:

$$z = \frac{y^2/R}{1+\sqrt{1-(1+k)(y/R)^2}} + Ay^4 + By^6 + Cy^8 + Dy^{10}$$

Next, the viewfinder optical system according to the first embodiment of the invention is described with reference to FIG. 1 and FIG. 2.

In FIG. 1, the first surface R1 is a stop. The second surface R2 is a refracting surface (entrance surface) coaxial with the first surface R1. The third surface R3 is a reflecting surface tilted (decentered) relative to the second surface R2. The fourth surface R4, the fifth surface R5 and the sixth surface R6 are reflecting surfaces shifted and tilted relative to the respective preceding surfaces. The seventh surface R7 is a refracting surface (exit surface) shifted and tilted relative to the sixth surface R6. All of the second to seventh surfaces R2 to R7 are formed in the surface of one transparent body made up from glass or plastic or like transparent optical material, constituting an optical element 10.

Further, the second surface R2 is positive in refractive power and the seventh surface R7 is negative in refractive power. In the neighborhood of the fourth surface R4, there is a primary image forming plane IP1, on which a first viewfinder image is formed. Reference character R8 denotes a reflecting mirror and reference character R9 denotes a secondary image forming plane, on which a second viewfinder image is formed. Reference character FL denotes a viewfinder field frame, which is positioned adjacent to the secondary image forming plane R9 to restrict the field of view of the viewfinder. Reference character R10 denotes a reflecting mirror and reference numeral 11 denotes a lens system (eyepiece lens) having surfaces R11 and R12 of spherical or rotationally-symmetric aspherical shape. Reference character R13 denotes an eye point, at which the viewfinder image formed on the secondary image forming plane R9 is observed through the eyepiece lens 11.

In the arrangement shown in FIGS. 1 and 2, the medium from an object (not shown) to the second surface R2 is the air. The space from the second surface R2 to the seventh surface R7 is a certain medium. The medium from the seventh surface R7 to the lens surface R11 and from the lens surface 12 to the eye point R13 is the air. It is to be noted that the second to seventh surfaces R2 to R7 may be formed otherwise by respective individual reflecting mirrors in separation from one another, and the space between the successive two of them may be the air.

Next, an optical function in the first embodiment is described by using FIG. 2.

The viewfinder optical system according to the first embodiment includes the eyepiece lens 11 and is an afocal system in which an even number of reflections, or four reflections, six reflections or even more reflections, occur as a whole.

A light flux L1 from the object enters the opening aperture of the stop R1, at which the amount of light thereof is restricted. After that, the light flux passes through the refracting surface R2, then is reflected from the reflecting surfaces R3 and R4 in succession and then is once focused to form a viewfinder image in the neighborhood of the reflecting surface R4 (on the primary image forming plane IP1).

The light flux based on the viewfinder image formed on the primary image forming plane IP1 is reflected from the surfaces R5 and R6 in succession, then passes through the refracting surface R7, and then is reflected from the reflecting surface R8, being re-focused to form a non-inverted erecting viewfinder image on the secondary image forming plane R9.

The light flux based on the viewfinder image formed on the secondary image forming plane R9 is reflected from the reflecting surface R10, and then is made to enter the eyepiece lens 11. The observer looks through the eyepiece lens 11, viewing the viewfinder image formed on the secondary image forming plane R9. It is to be noted that the light flux L1 from the object is intermediately focused at the position IP1 in the space between the surfaces R4 and R5, and the pupil light rays are intermediately focused at a position PE in the space between the surfaces R4 and R5.

Further, the reference axis between the surfaces R2 and R3 and the reference axis between the surfaces R4 and R5 intersect each other, and the reference axis between the surfaces R4 and R5 and the reference axis between the surfaces R6 and R7 intersect each other. In other words, the optical paths of each ray of the light flux reflected from the surface R3 up to the surface R6 in succession intersect each other two times.

It will be appreciated from the foregoing that, in the first embodiment, the optical paths of each of the light rays including a ray on the reference axis intersect each other twice, so that the minimization of the size of the whole optical system is thus assured while still maintaining a good optical performance to be achieved.

Next, a viewfinder optical system according to a second embodiment of the invention is described with reference to FIG. 3.

Figure 3:
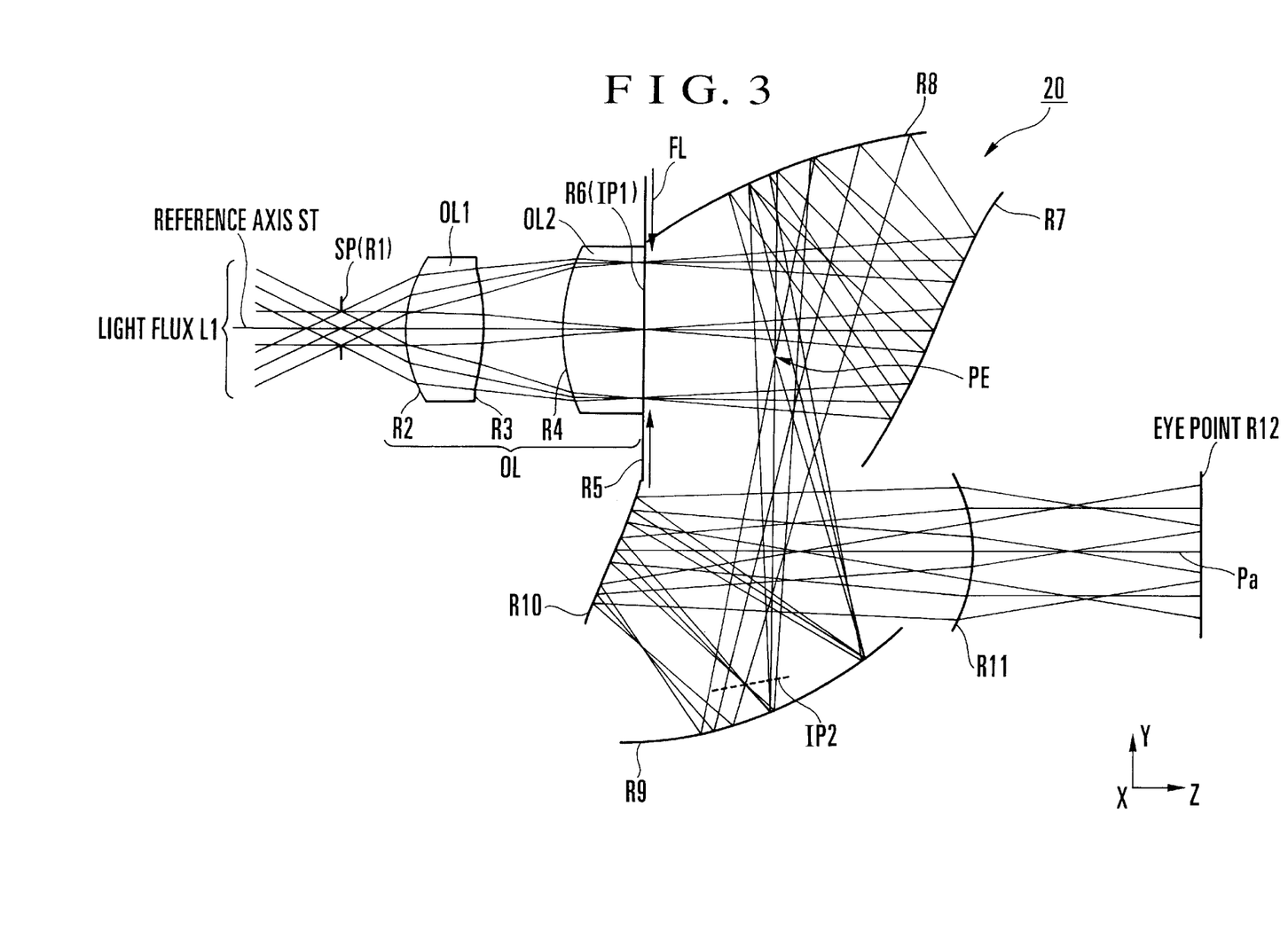
FIG. 3 is a sectional view of the main parts of a second embodiment of the invention.

In FIG. 3, reference character R1 denotes a stop. Reference character OL denotes an objective lens having two lenses OL1 and OL2. Reference characters R2 and R3 denote lens surfaces of the lens OL1, and reference characters R4 and R5 denote lens surfaces of the lens OL2. The lens surfaces R2, R3, R4 and R5 are of spherical form or aspherical form of rotational symmetry, and are refracting surfaces having positive refractive powers.

The sixth surface R6 is a refracting surface coaxial with the fifth surface R5. The surfaces R5 and R6 are cemented together. The seventh surface R7 is a reflecting surface tilted (decentered) relative to the sixth surface R6. The eighth surface R8, the ninth surface R9 and the tenth surface R10 are reflecting surfaces shifted and tilted relative to the respective preceding surfaces. The eleventh surface R11 is a refracting surface shifted and tilted relative to the tenth surface R10. All of the sixth to eleventh surfaces R6 to R11 are formed in the surface of one transparent body made up from glass or plastic or like transparent optical material, constituting an optical element 20.

In the neighborhood of the sixth surface R6, there is a primary image forming plane IP1. On the primary image forming plane IP1, a first viewfinder image is formed. Reference character IP2 denotes a secondary image forming plane, on which a second viewfinder image is formed. Reference character FL denotes a viewfinder field frame, which is positioned adjacent to the primary image forming plane IP1 to restrict the field of view of the viewfinder. Reference character R12 denotes an eye point, at which the viewfinder image formed on the secondary image forming plane IP2 is observed through the optical element 20.

In FIG. 3, the spaces from the sixth surface R6 to the eleventh surface R11 are made up from a common medium. Incidentally, the seventh to tenth surfaces R7 to R10 may be formed otherwise by respective individual reflecting mirrors in separation from one another, so that the space between any successive two of them may be the air.

Next, an optical function in the second embodiment is described by using FIG. 3.

The viewfinder optical system according to the second embodiment includes the objective lens OL and is an afocal system in which reflection occurs an even number of times as a whole. A light flux L1 from the object enters the stop R1, where the amount of light thereof is restricted, then passes through the refracting surfaces R2, R3, R4 and R5 constituting the objective lens OL, and then enters the surface (entrance surface) R6 of the optical element 20. A viewfinder image is once formed on the primary image forming plane IP1 adjacent to the surface R6. The light flux from the primary image forming plane IP1 is reflected from the reflecting surface R7 and then is reflected from the reflecting surfaces R8 and R9 in succession. On the secondary image forming plane IP2 adjacent to the surface R9, the light flux is re-focused to form a non-inverted erecting viewfinder image. The light flux from the secondary image forming plane IP2 is reflected from the reflecting surface R10 and then passes through the refracting surface (exit surface) R11, being guided to the eye point R12, at which the viewfinder image is observed. It is to be noted that the light flux L1 from the object is focused at the position IP2 in the space between the surfaces R9 and R10, and the pupil rays are intermediately focused at a position PE in the space between the surfaces R8 and R9.

Further, the reference axis between the surfaces R6 and R7 and the reference axis between the surfaces R8 and R9 intersect each other, and the reference axis between the surfaces R8 and R9 and the reference axis between the surfaces R10 and R11 intersect each other. In other words, the optical paths of each ray of the light flux reflected from the surface R7 up to the surface R10 intersect each other two times.

The second embodiment provides such an arrangement that assures minimization of the size of the whole optical system, while still maintaining the viewfinder image to be observed at a good quality.

It will be appreciated from the foregoing that the second embodiment is characterized by having at least four reflecting surfaces having powers, forming at least two real images in the entire optical path, and folding the reference axis so as to intersect itself at least two times in the entire optical path. This leads to provide multiple use of a space. Such an increase of the efficiency of utilizing the space facilitates improvements of the compact form of the viewfinder optical system.

Further, the above-described reflecting surfaces include at least one rotationally-asymmetric surface, thereby giving an additional advantage of not merely conducting a light flux by folding the optical path, but also reducing the distortion to a minimum for a better optical performance. Thus, a compact viewfinder optical system whose layout can be made free is achieved.

Also, despite the inclusion of the eyepiece lens system, the optical system is made afocal with four or six reflections. With this arrangement, in constructing a two-real image viewfinder, a fewer members suffice for obtaining a non-inverted erecting viewfinder image, thus achieving improvements of the compact form.

The viewfinder field frame can be positioned adjacent to the primary or secondary image forming plane. That is, the frame and other marks of information are positioned at an intermediate focus position, so that the contours of the fields of view and the marks can be clearly seen, and moreover that, even if the observing eye more or less changes its position, the frame is kept to display the constant field of view.

The eyepiece lens system is arranged in separation from the surfaces which are given power. This allows the power of the eyepiece lens to strengthen. therefore, the viewfinder magnification can be raised and the degree of freedom of the layout can be increased.

Next, numerical examples 1 and 2 which correspond to the first and second embodiments described above are shown. In the numerical data for the examples 1 and 2, the notation "E-0X" means "$\times 10^{-x}$".

Numerical Example 1:

| i | Ri | Di | Ni | vi | θi |
|---|---|---|---|---|---|
| 1 | Stop | 2.2080 | Air | | |
| 2 | 184.0000 | 9.4432 | 1.49171 | 57.4 | |
| 3 | Free Form Surface | 8.4989 | 1.49171 | 57.4 | 22.5 |
| 4 | Free Form Surface | 22.0800 | 1.49171 | 57.4 | 22.5 |
| 5 | Free Form Surface | 8.3939 | 1.49171 | 57.4 | −22.5 |
| 6 | Free Form Surface | 9.2000 | 1.49171 | 57.4 | −22.5 |
| 7 | 23.1270 | 3.8940 | Air | | |
| 8 | Flat Plane | 3.9000 | Air | | −45 |
| 9 | Flat Plane | 11.2800 | Air | | |
| 10 | Flat Plane | 6.0000 | | | 45 |
| 11 | * | 2.3500 | 1.49171 | 57.4 | |
| 12 | −13.3660 | 15.0000 | Air | | |
| 13 | Pupil | | | | |

*Aspheric Surface of Rotational Symmetry

The shape of the free form surface

| Coefficients & Variable | Surface | | | |
|---|---|---|---|---|
| | R3 | R4 | R5 | R6 |
| C03 | −2.3974 E − 04 | −5.1205 E − 04 | 6.4665 E − 05 | −9.3902 E − 06 |
| C21 | −2.9991 E − 04 | −1.0573 E − 03 | 5.9886 E − 05 | −5.7386 E − 05 |
| C04 | 2.5699 E − 05 | −5.2518 E − 06 | 1.2745 E − 05 | 1.5000 E − 05 |
| C22 | 1.2123 E − 04 | −3.8305 E − 05 | 4.6557 E − 05 | 5.0313 E − 05 |
| C40 | 1.5219 E − 05 | −4.0764 E − 05 | −3.3922 E − 06 | 1.0597 E − 05 |
| a | −2.5890 E − 02 | −1.3855 E − 01 | −1.2622 E − 01 | 4.8996 E − 02 |
| b | −5.9148 E − 02 | 1.8367 E − 01 | 8.9318 E − 02 | 1.4533 E − 02 |
| t | 1.8445 E + 01 | 4.2660 E + 01 | −1.7379 E + 01 | −2.5368 E + 01 |

The shape of the aspheric surface of rotational symmetry

| Radius & Coefficient | Surface R11 |
|---|---|
| R | 2.7633 E + 01 |
| k | 1.0253 E − 01 |
| A | −8.4689 E − 05 |
| B | −2.0181 E − 07 |
| C | 0 |

Numerical Example 2:

| i  | Ri               | Di      | Ni     | νi   | θi    |
|----|------------------|---------|--------|------|-------|
| 1  | Stop             | 2.9235  | Air    |      |       |
| 2  | *                | 3.4107  | 1.49171| 57.4 |       |
| 3  | *                | 3.5691  | Air    |      |       |
| 4  | 8.9166           | 3.6056  |        |      |       |
| 5  | ∞                | 0.0000  | 1.49171| 57.4 |       |
| 6  | ∞                | 13.0000 | 1.49171| 57.4 |       |
| 7  | Free Form Surface| 10.0000 | 1.49171| 57.4 | −22.5 |
| 8  | Free Form Surface| 24.0000 | 1.49171| 57.4 | −22.5 |
| 9  | Free Form Surface| 10.0000 | 1.49171| 57.4 | 22.5  |
| 10 | Free Form Surface| 16.0000 | 1.49171| 57.4 | 22.5  |
| 11 | *                | 10.0000 | Air    |      |       |
| 12 | Pupil            |         | Air    |      |       |

*Aspheric Surface of Rotational Symmetry

The shape of the free form surface

| Coefficients | Surface | | | |
|---|---|---|---|---|
| & Variable | R7 | R8 | R9 | R10 |
| C03 | 1.4104 E − 03 | 4.4839 E − 04 | −5.0092 E − 04 | −2.8376 E − 03 |
| C21 | −1.4653 E − 03 | 8.1534 E − 05 | −9.4729 E − 04 | 6.7608 E − 03 |
| C04 | 8.9525 E − 05 | 2.9934 E − 05 | −2.5117 E − 05 | 3.1594 E − 05 |
| C22 | 2.7570 E − 04 | 6.0570 E − 05 | 7.4274 E − 04 | −1.1310 E − 03 |
| C40 | 9.0748 E − 06 | 2.3420 E − 05 | −5.7366 E − 04 | −7.1597 E − 04 |
| a | 1.1668 E − 01 | −1.3658 E − 03 | 1.8595 E − 02 | 2.8907 E − 01 |
| b | −1.4773 E − 01 | 7.0961 E − 02 | −1.3026 E − 01 | −3.3219 E − 01 |
| t | −3.9511 E + 03 | −2.2148 E + 01 | 2.2500 E + 01 | −1.8445 E + 01 |

The shape of the aspheric surface of rotational symmetry

| Radius & Coeffi- | Surface | | |
|---|---|---|---|
| cient | R2 | R3 | R11 |
| R | 6.6862 E + 00 | −7.7823 E + 00 | −7.1802 E + 00 |
| k | 1.8434 E + 00 | 8.4054 E − 02 | −5.0661 E + 00 |
| A | −4.1629 E − 04 | 1.3923 E − 03 | −1.3552 E − 03 |
| B | 1.4115 E − 04 | −1.2104 E − 04 | 2.6115 E − 05 |
| C | −6.6437 E − 06 | 3.0858 E − 05 | −3.1095 E − 07 |
| D | 0 | 0 | 0 |

According to each of the embodiments described above, a plurality of power-given reflecting surfaces are appropriately arranged in decentered relation to make intersection of an optical axis (reference axis) with itself twice in the entire optical path, and constructed so that formation of a viewfinder image occurs at least twice, thus assuring improvement of the compact form of the viewfinder optical system and good correction of various aberrations. It is, therefore, made possible to achieve a viewfinder optical system of the real image type capable of allowing a correct viewfinder image of good quality to be observed.

Next, as another embodiment of the invention, a photographing apparatus having the viewfinder optical system of the numerical example 1 or 2 is described with reference to FIGS. 4(a) and 4(b).

Figure 4A:
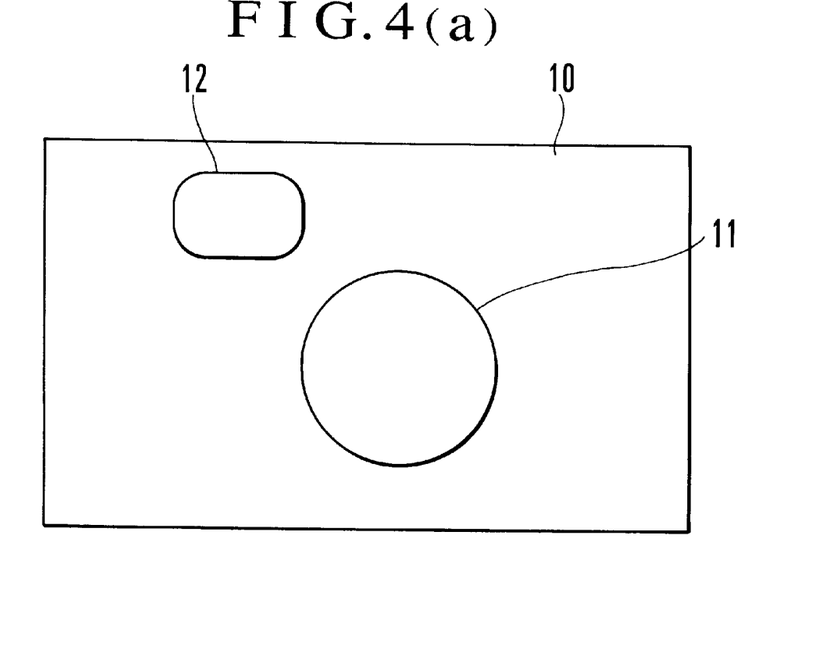
FIGS. 4(a) and 4(b) are schematic diagrams of an optical apparatus having the viewfinder optical system shown in FIG. 2 or 3.
Figure 4B:
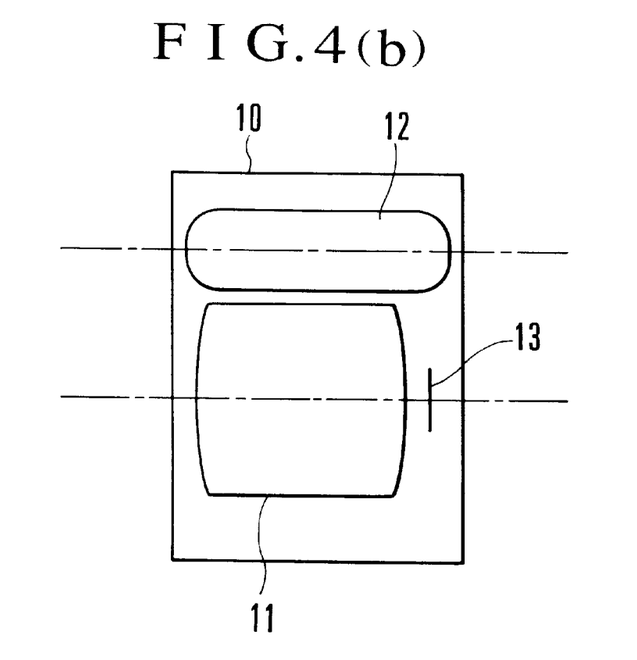

FIG. 4(a) is a front view of the photographing apparatus, and FIG. 4(b) is a longitudinal side section view of the photographing apparatus. In FIGS. 4(a) and 4(b), reference numeral 10 denotes a body (casing) of the photographing apparatus. Reference numeral 11 denotes a photographic optical system. Reference numeral 12 denotes a viewfinder optical system, for which any one of the numerical examples 1 and 2 is employed. Reference numeral 13 denotes a film serving as a photo-sensitive surface.

As mentioned above, the viewfinder optical system of the numerical example 1 or 2 can be applied to the photographing apparatus with an advantage of realizing reduction of its bulk and size to a minimum and enhancing the performance.

What is claimed is:

1. A viewfinder optical system for conducting light from an object to an observer, comprising:

a plurality of reflecting surfaces having optical powers, optical paths of each ray of a light flux reflected successively by said plurality of reflecting surfaces intersecting each other at least twice, wherein the light from the object forms an image at least twice when passing through said viewfinder optical system.

2. A viewfinder optical system according to claim 1, further comprising:

an optical element made from a transparent optical material, said optical element comprising:
an entrance surface which the light from the object enters;
said plurality of reflecting surfaces; and
an exit surface from which the light after having been reflected from said plurality of reflecting surfaces emerges.

3. A viewfinder optical system according to claim 2, wherein at least one of said entrance surface and said exit surface has an optical power.

4. A viewfinder optical system according to claim 1, wherein at least one of said plurality of reflecting surfaces is an aspheric surface of rotational asymmetry.

5. A viewfinder optical system according to claim 1, further comprising:

an eyepiece optical system disposed on a side closer to the observer than said plurality of reflecting surfaces.

6. A viewfinder optical system according to claim 1, further comprising:

an objective optical system disposed on a side closer to the object than said plurality of reflecting surfaces.

7. A viewfinder optical system according to claim 1, wherein said plurality of reflecting surfaces consists of four reflecting surfaces.

8. An optical apparatus comprising:

a viewfinder optical system according to claim 1.

* * * * *

UNITED STATES PATENT AND TRADEMARK OFFICE
CERTIFICATE OF CORRECTION

PATENT NO. : 6,166,859
DATED : December 26, 2000
INVENTOR(S) : Yumiko Inuzuka et al.

It is certified that error appears in the above-identified patent and that said Letters Patent is hereby corrected as shown below:

<u>Column 2,</u>
Line 15, "invention is " should read -- invention --.

<u>Column 7,</u>
Line 54, "a fewer" should read -- fewer --.

Signed and Sealed this

Twenty-sixth Day of February, 2002

Attest:

JAMES E. ROGAN
*Attesting Officer*     *Director of the United States Patent and Trademark Office*